United States Patent
Rizzo, Jr.

(10) Patent No.: US 9,421,661 B2
(45) Date of Patent: Aug. 23, 2016

(54) AIRFOIL EDGE FORM TRANSFER GRINDING TOOL

(71) Applicant: UNITED TECHNOLOGIES CORPORATION, Farmington, CT (US)

(72) Inventor: John P. Rizzo, Jr., Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 196 days.

(21) Appl. No.: 14/221,574

(22) Filed: Mar. 21, 2014

(65) Prior Publication Data

US 2014/0323022 A1    Oct. 30, 2014

Related U.S. Application Data

(60) Provisional application No. 61/817,740, filed on Apr. 30, 2013.

(51) Int. Cl.
| B24B 19/14 | (2006.01) |
| B23P 6/00 | (2006.01) |
| B24B 19/00 | (2006.01) |
| F01D 5/00 | (2006.01) |

(52) U.S. Cl.
CPC ............. *B24B 19/14* (2013.01); *B23P 6/002* (2013.01); *B24B 19/009* (2013.01); *F01D 5/005* (2013.01)

(58) Field of Classification Search
CPC ....... B23P 6/002; B24B 19/009; B24B 19/14; B24B 53/07; B24B 7/18; F01D 5/005; F05D 2230/80
See application file for complete search history.

(56) References Cited

U.S. PATENT DOCUMENTS

| 2,336,303 | A | * | 12/1943 | Schubert | B21D 53/78 29/889.3 |
| 2,680,392 | A | * | 6/1954 | Clement | B24B 19/14 29/889.7 |
| 3,157,174 | A | * | 11/1964 | Lewis | B24B 53/14 125/11.03 |
| 4,457,113 | A | * | 7/1984 | Miller | B24D 5/04 451/541 |
| 4,611,438 | A | * | 9/1986 | Siden | B24D 5/00 451/461 |
| 4,977,709 | A | * | 12/1990 | Siden | B24B 3/33 451/541 |
| 5,281,062 | A | | 1/1994 | Dunkman et al. | |
| 5,609,518 | A | * | 3/1997 | Lucchesi | B24B 49/00 144/134.1 |
| 5,954,464 | A | | 9/1999 | Dansereau et al. | |
| 6,302,625 | B1 | * | 10/2001 | Carey | B23C 3/12 29/402.19 |
| 6,361,412 | B1 | * | 3/2002 | Kaiser | B24B 53/062 125/11.03 |
| 8,216,026 | B2 | | 7/2012 | Joslin | |
| 8,801,502 | B2 | * | 8/2014 | Ng | B24B 19/009 451/348 |
| 9,085,060 | B2 | * | 7/2015 | Clark | B24B 23/026 |
| 2007/0173184 | A1 | * | 7/2007 | Yen | B24B 9/14 451/65 |
| 2008/0105656 | A1 | * | 5/2008 | Smith | B23H 9/10 219/69.17 |
| 2015/0072602 | A1 | * | 3/2015 | Welch | B24B 23/02 451/547 |

* cited by examiner

*Primary Examiner* — Timothy V Eley
(74) *Attorney, Agent, or Firm* — Cantor Colburn LLP

(57) ABSTRACT

A grinding tool is provided that includes an axial grinding wheel having a circumferential cutting slot formed therein, the cutting slot having a cross-sectional profile that includes a floor having a first radius of curvature, a first side wall rising upward from the floor and having a second radius of curvature, a second side wall rising upward from the floor opposite the first side wall and having a third radius of curvature. At least one radius of curvature corresponds to a surface, such as a leading edge of a gas turbine engine airfoil.

20 Claims, 3 Drawing Sheets

# AIRFOIL EDGE FORM TRANSFER GRINDING TOOL

CROSS-REFERENCE TO RELATED APPLICATIONS

This application claims priority to U.S. Provisional Patent Application No. 61/817,740 filed Apr. 30, 2013, which is incorporated by reference herein in its entirety.

BACKGROUND OF THE INVENTION

1. Field of the Invention

The subject invention relates generally to grinding tools for machining complex part configurations, and more particularly, to an airfoil edge form transfer grinding tool for gas turbine rotor blades and vanes.

2. Description of Related Art

Complex part configurations utilize many different methods to form the desired features and surface contours. Many machining methods provide the desired shape, but are unable to provide a desired surface finish, or they leave burrs or other features that must be removed in subsequent process steps. Manual deburring operations conducted by a skilled operator can take an undesirably long time, and care must be taken not to damage the part. Further, the uniformity and consistency between parts utilizing a manual deburring process may not be sufficient for desired purposes. Also, the formation of complex part shapes and geometries can be prohibitively expensive and time consuming and may still not provide consistent uniform results.

An example of a complex part configuration that can be time consuming and prohibitively expensive to machine or otherwise form are the leading and trailing edges of aircraft gas turbine engine rotor blade airfoils. The geometry of these edge features affect the performance of the airfoil and must therefore be machined with precision in a manner that produces repeatable and consistent results.

Accordingly, it would be desirable to provide an inexpensive and efficient method of forming the leading and training edges of an airfoil blade that reduces process time and provides repeatable and consistent results.

SUMMARY OF THE INVENTION

The subject invention is directed to a new and useful edge form transfer grinding tool for a gas turbine engine airfoil that provides repeatable and consistent results during a machining process and includes, among other things, an axial grinding wheel having an abrasive finish and having a circumferential cutting slot formed therein.

The circumferential cutting slot has a continuous cross-sectional profile that includes a floor having a first radius of curvature, a first side wall rising upward from the floor and having a second radius of curvature, and a second side wall rising upward from the floor opposite the first side wall and having a third radius of curvature.

The radius of curvature of the floor of the cutting slot is related to a leading edge of the airfoil. In one embodiment of the subject invention, the radius of curvature of the floor of the cutting slot is related to a trailing edge of the airfoil.

In another embodiment of the subject invention, the radius of curvature of the floor of the cutting slot is related to a leading edge of the airfoil.

The radius of curvature of the first side wall of the cutting slot is related to a pressure side of the airfoil, and the radius of curvature of the second side wall of the cutting slot is related to a suction side of the airfoil.

In addition, each side wall of the cutting slot includes an upper shoulder, and each upper shoulder has a fourth radius of curvature.

In an embodiment of the subject invention, the axial grinding wheel is provided at the distal end of an elongated shaft. A proximal end portion of the shaft is threaded for mating with a threaded bore of a turning machine, and a medial portion of the shaft includes a mounting section for engagement by a work holding fixture.

The subject invention is also directed to an airfoil edge form transfer tool that includes an elongated shaft defining a longitudinal axis, and an axial grinding wheel provided at a distal end of the shaft, wherein the grinding wheel has an abrasive surface finish and a circumferential cutting slot formed therein.

The circumferential cutting slot has a continuous cross-sectional profile that includes a floor having a first radius of curvature relating to an edge of the airfoil, a first side wall rising up from the floor and having a second radius of curvature related to a high pressure side of the airfoil, a second side wall rising up from the floor and having a third radius of curvature related to a low pressure side of the airfoil, wherein each side wall includes an upper shoulder, and each upper shoulder has a fourth radius of curvature.

These and other features of the airfoil edge form transfer tool of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art will readily understand how to make and use the subject invention without undue experimentation, embodiments thereof will be described in detail herein below with reference to certain figures, wherein.

DETAILED DESCRIPTION OF PREFERRED EMBODIMENTS

Figure 1:
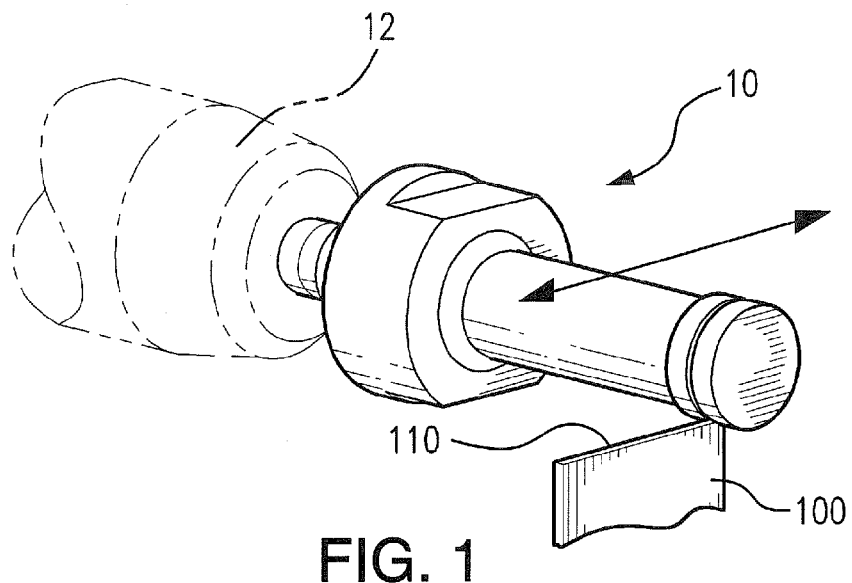
FIG. 1 is a perspective view of the airfoil edge form transfer tool during a forming operation passing along the edge of an airfoil.

Referring now to the drawings, wherein like reference numerals identify similar structural features or aspects, there is illustrated in FIG. 1 an airfoil edge form transfer grinding tool designated generally by reference numeral 10. As shown in FIG. 1, in use, the grinding tool 10 is mounted to the spindle of a multi-axis milling machine by way of a support fixture or chuck 12. The form transfer grinding tool 10 can be used to manufacture original engine components or to repair or refurbish used or damaged engine components, as well as other parts or components having complex surface geometries.

The form transfer grinding tool 10 is depicted in FIG. 1 passing along a linear axis to form or otherwise transfer the edge profile to an airfoil shaped turbine rotor blade 100. By way of example, rotor blade 100 is configured for use within the high pressure section of the engine compressor. Those skilled in the art will readily appreciate that the edge form transfer grinding tool 10 is adapted and configured for high speed operation at speeds ranging from 60,000-100,000 rotations per minute, providing a feed rate of about 2500-4000 feet per minute.

Figure 2:
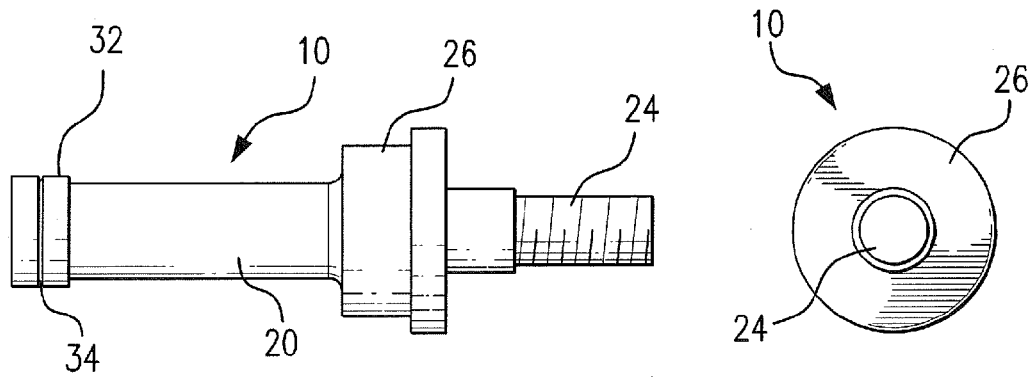
FIG. 2 is a side elevational view of the airfoil edge form transfer tool.
Figure 3:
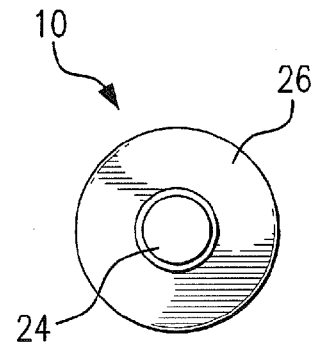
FIG. 3 is a rear end view of the airfoil edge form transfer tool.
Figure 4:
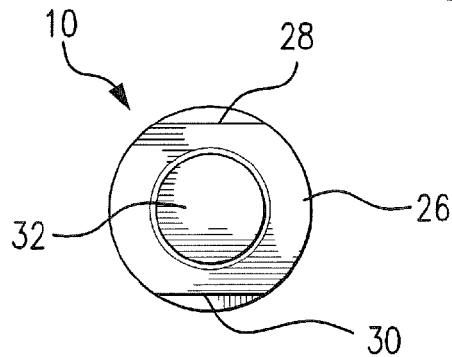
FIG. 4 is a front end view of the airfoil edge form transfer tool.

Referring to FIGS. 2 through 4, the form transfer tool 10 includes an elongated shaft 20 defining a longitudinal axis. The elongated shaft 20 has a portion 24 (which in the illustrated embodiment is threaded) at the proximal end thereof for engaging a reception bore of a milling machine with which it is employed. A medial mounting flange 26 is provided on the elongated shaft 20 and it includes a pair of diametrically opposed flat surfaces 28, 30 which enable the use of wrench or similar hand tool during the threaded attachment of the form transfer tool 10 to a milling machine. Those skilled in the art will readily appreciate however, that the configuration of the mounting flange 26 and the threaded portion 24 of the shaft 20 will largely depend upon the type of milling machine employed and the mounting fixtures that are associated therewith.

A circular grinding wheel 32 is provided at the distal end of the shaft 20. In an exemplary embodiment, the diameter of the grinding wheel 32 is preferably less than 1.0 inch and more preferably less than 0.50 inches, with an axial thickness of less than about 0.25 inches. Those skilled in the art will readily appreciate that the dimensions of the grinding wheel 32 will vary depending upon the cutting application, and more particularly, depending upon the size of the rotor blades with which it is employed. Indeed, it is envisioned that the axial thickness of the grinding wheel 32 could be as small as 0.125 inches and as large as 0.75 inches.

The grinding wheel 32 has a circumferential cutting slot 34 formed therein, preferably at the center of the wheel. The shape or profile of the cutting slot 34 corresponds with the desired finished shape or form of the airfoil edge. Thus, cutting slot 34 is adapted and configured to efficiently form a finished radiused edge on an airfoil shaped turbine blade without adversely affecting the contours of the high pressure and low pressure surfaces of the airfoil.

Figure 5:
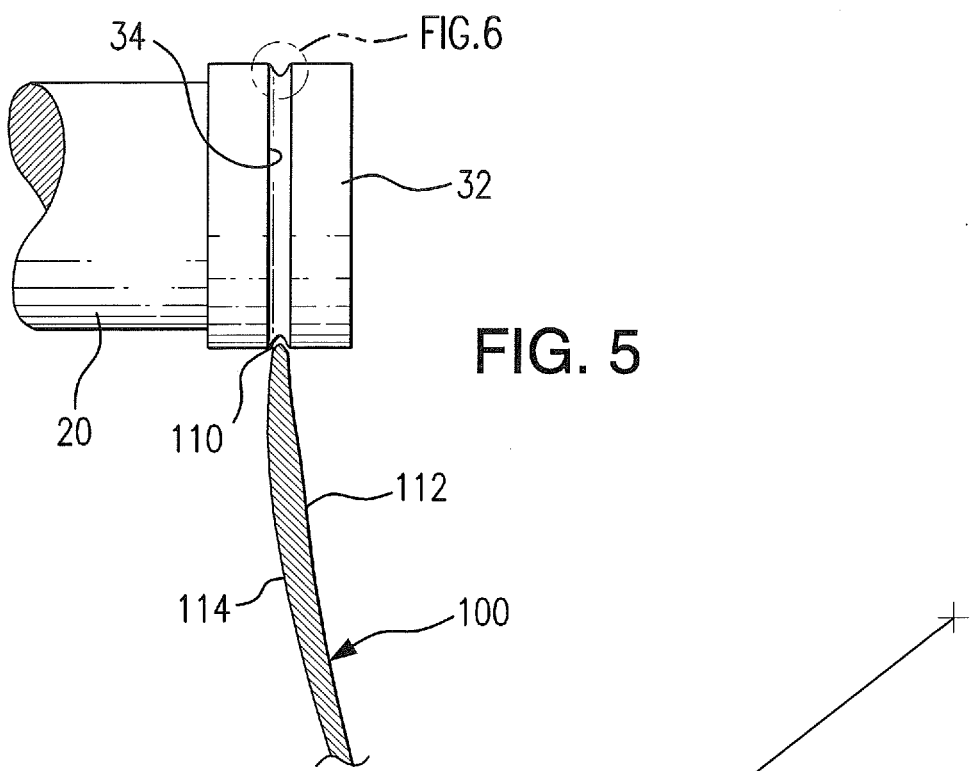
FIG. 5 is a side elevational view of the axial grinding wheel of the edge form transfer tool, along with a turbine blade.
Figure 6:
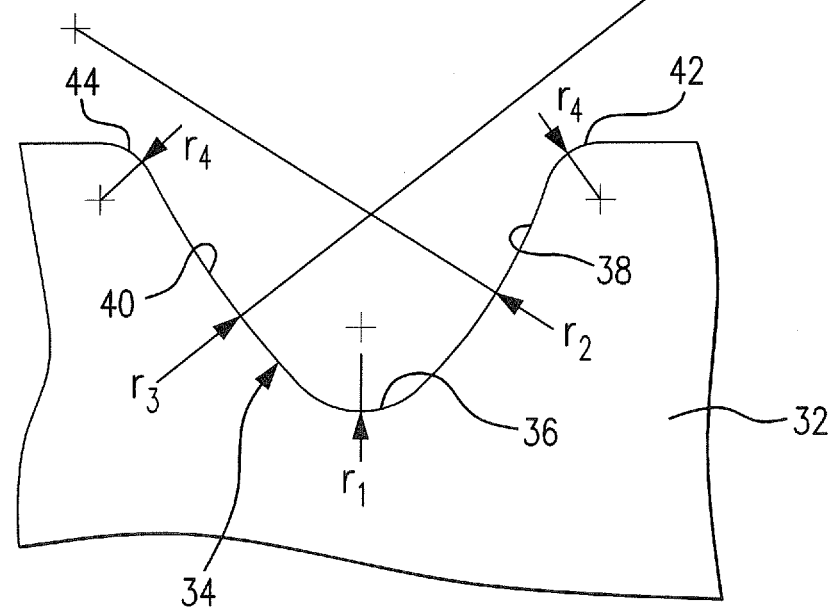
FIG. 6 is an enlarged localized view of the cutting slot of the axial grinding wheel shown in FIG. 5, and illustrating the radius of curvature for each surface of the cutting slot.

Referring to FIGS. 5 and 6, the cutting slot 34 of grinding wheel 32 has a continuous cross-sectional profile that includes a bottom floor 36 having a radius of curvature $r_1$ that is related to an edge of the airfoil shaped turbine or compressor blade or vane 100. Moreover, it is envisioned that the radius of curvature $r_1$ of the floor 36 of cutting slot 34 can relate to either the leading edge of an airfoil or the trailing edge of the an airfoil. By way of example and not being intended to limit the subject disclosure in any way, FIG. 5 illustrates the grinding wheel 32 of form transfer tool 10 being used to form the leading or trailing edge 110 of an airfoil 100.

As shown in FIG. 6, the cutting slot 34 of grinding wheel 32 has a first side wall 38 rising upward from the floor 36 and having a second radius of curvature $r_2$ which is related to the pressure side 112 of the airfoil 100. A second side wall 40 rises upward from the floor 36 opposite the first side wall 38 and it has a third radius of curvature $r_3$ which is related to the suction side 114 of the airfoil 100. Those skilled in the art will readily appreciate that the radius of curvature $r_2$ of the first side wall and the radius of curvature $r_3$ of the second side wall will naturally depend upon the shape of the airfoil being manufactured or repaired, or more generally the shape of whatever part is being formed.

A first upper shoulder 42 extends from the first side wall 38 and a second upper shoulder 44 extends from the second side wall 40. Both upper shoulders 42, 44 have a fourth radius of curvature $r_4$ that provides a smooth transition between the opposed cutting slot side walls 38, 40 and the outer periphery of the grinding wheel 32. In the alternative, the upper shoulder of each side wall could have the contour of a polynomial function, rather than a radiused curve. Indeed, successful tool designs have been demonstrated with 2nd order and 4th order polynomials.

The continuous shaped profile of the cutting slot 34 enables the geometry or form of the cutting slot 34 to be transferred directly to the edge 110 of airfoil 100, thereby reducing the number of steps that would normally be required to machine the leading or trailing edge of an airfoil shaped rotor blade using conventional grinding tools.

Figure 7:
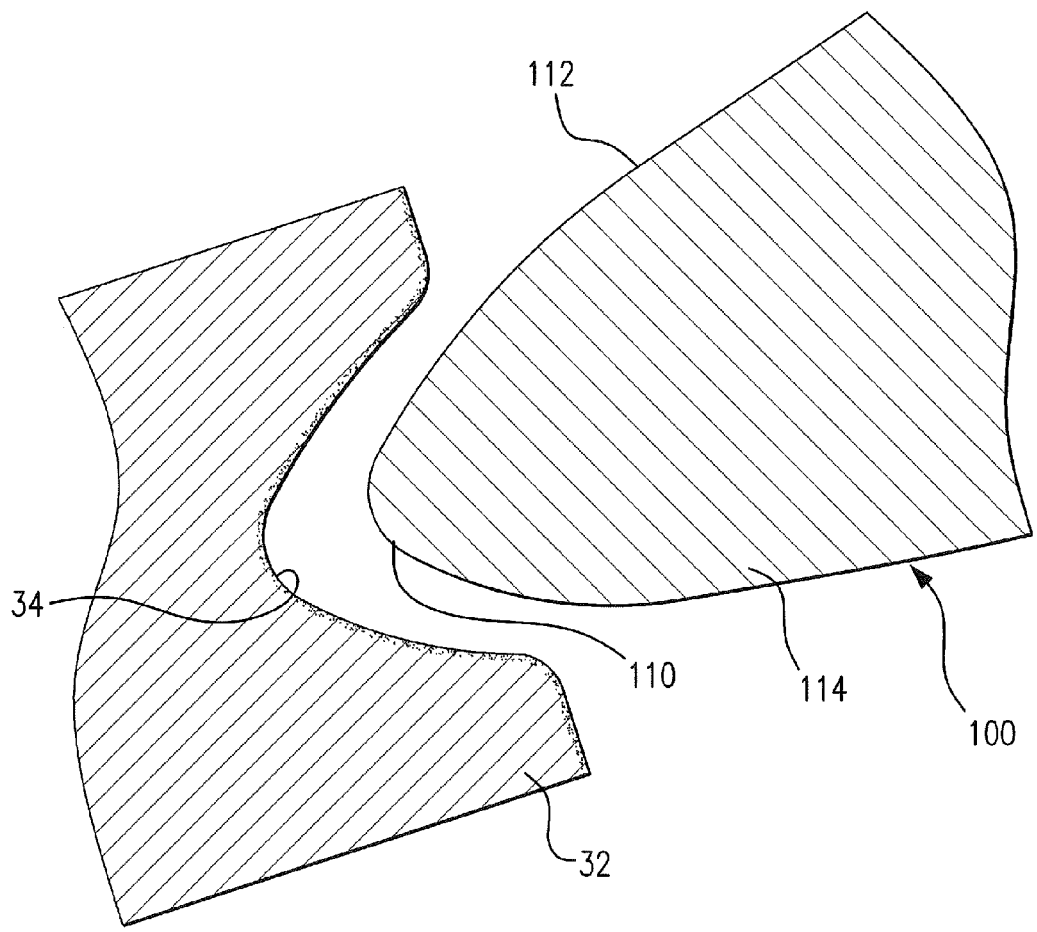
FIG. 7 is a cross-sectional view of the grinding wheel, in the region of the cutting slot, which has an abrasive surface finish.

Referring to FIG. 7, the grinding wheel 32 and more particularly the surfaces of the cutting slot 34 and the regions of the wheel 32 adjacent the cutting slot 34 have an abrasive finish to accomplish the intended metal-cutting process or form transfer. More particularly, the abrasive surfaces of the grinding wheel 32 have embedded abrasive grains. These grains of abrasive in the surface function as microscopic single-point cutting edges that shear tiny chips of metal from the edge of the airfoil, in this case, the leading edge surface of airfoil 100.

Those skilled in the art will readily appreciate that the form transfer tool of the subject invention could be manufactured using a variety of conventional fabrication techniques. For example, the tool could be turned or ground from a steel or carbide blank and then brazed or plated with CBN (cubic boron nitride) or a diamond material to create the abrasive grinding surfaces. Alternatively, the tool could be formed by sintering CBN or diamond in a glass matrix on a steel or carbide shaft that is subsequently dress formed into a cutter using a plunge dresser.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A grinding tool for an airfoil comprising:
an axial grinding wheel having a circumferential cutting slot formed therein, the cutting slot being configured to form a finished radiused edge of the airfoil, the slot having a cross-sectional profile that includes a floor having a first radius of curvature, a first side wall rising upward from the floor and having a second radius of curvature, and a second side wall rising upward from the floor opposite the first side wall and having a third radius of curvature, wherein the first radius of curvature is different from the second radius of curvature and the third radius of curvature is different from the first radius of curvature and the second radius of curvature.

2. A grinding tool as recited in claim 1, wherein the first radius of curvature is configured to form a leading edge of the airfoil and wherein the airfoil is a gas turbine engine airfoil.

3. A grinding tool as recited in claim 1, wherein the first radius of curvature is configured to form a trailing edge of the airfoil and wherein the airfoil is a gas turbine engine airfoil.

4. A grinding tool as recited in claim 1, wherein the radius of curvature of the first side wall of the cutting slot is configured to form a pressure side of the airfoil and wherein the airfoil is a gas turbine engine airfoil.

5. A grinding tool as recited in claim 1, wherein the radius of curvature of the second side wall is configured to form a suction side of the airfoil and wherein the airfoil is a gas turbine engine airfoil.

6. A grinding tool as recited in claim 1, wherein each side wall of the cutting slot includes an upper shoulder aligned with each other, and each upper shoulder has a fourth radius of curvature, the fourth radius of curvature being different from the first radius of curvature, the second radius of curvature and the third radius of curvature.

7. A grinding tool as recited in claim 1, wherein the cutting slot has an abrasive surface finish.

8. A grinding tool as recited in claim 1, wherein the axial grinding wheel is provided at the distal end of an elongated shaft.

9. A grinding tool as recited in claim 8, wherein a proximal end portion of the elongated shaft is threaded.

10. A grinding tool as recited in claim 9, wherein a medial portion of the elongated shaft includes a mounting section.

11. A grinding tool comprising:
   a) an elongated shaft defining a longitudinal axis; and
   b) an axial grinding wheel provided at a distal end of the shaft, the grinding wheel having a circumferential cutting slot formed therein, the cutting slot having a continuous cross-sectional profile that includes a floor having a first radius of curvature is configured to form an edge of a gas turbine engine airfoil, a first side wall rising upward from the floor and having a second radius of curvature configured to form a pressure side of the airfoil, a second side wall rising upward from the floor opposite the first side wall and having a third radius of curvature configured to form a suction side of the airfoil, wherein the first radius of curvature is different from the second radius of curvature and the third radius of curvature is different from the first radius of curvature and the second radius of curvature.

12. A grinding tool as recited in claim 11, wherein the radius of curvature of the floor of the cutting slot is configured to form a leading edge of the airfoil.

13. A grinding tool as recited in claim 11, wherein the radius of curvature of the floor of the cutting slot is configured to form a trailing edge of the airfoil.

14. A grinding tool as recited in claim 11, wherein each side wall of the cutting slot includes an upper shoulder aligned with each other, and each upper shoulder has a fourth radius of curvature, the fourth radius of curvature being different from the first radius of curvature, the second radius of curvature and the third radius of curvature.

15. A grinding tool as recited in claim 11, wherein the cutting slot has an abrasive surface finish.

16. A grinding tool as recited in claim 11, wherein a proximal end portion of the elongated shaft is threaded.

17. A grinding tool as recited in claim 11, wherein a medial portion of the elongated shaft includes a mounting section.

18. A grinding tool comprising:
   a) an elongated shaft defining a longitudinal axis; and
   b) an axial grinding wheel provided at a distal end of the shaft, the grinding wheel having an abrasive surface finish and a circumferential cutting slot formed therein, the cutting slot having a continuous cross-sectional profile that includes a floor having a first radius of curvature configured to form an edge of a gas turbine engine airfoil, a first side wall rising upward from the floor and having a second radius of curvature configured to form a pressure side of the airfoil, a second side wall rising upward from the floor and having a third radius of curvature configured to form a suction side of the airfoil, wherein each side wall includes an upper shoulder aligned with each other, and each upper shoulder has a fourth radius of curvature, wherein the first radius of curvature is different from the second radius of curvature and the third radius of curvature is different from the first radius of curvature and the second radius of curvature and the fourth radius of curvature is different from the first radius of curvature, the second radius of curvature and the third radius of curvature.

19. A grinding tool as recited in claim 18, wherein the first radius of curvature is configured to form a leading edge of the airfoil.

20. A grinding tool as recited in claim 18, wherein the first radius of curvature is configured to form a trailing edge of the airfoil.

* * * * *